Figure 1:
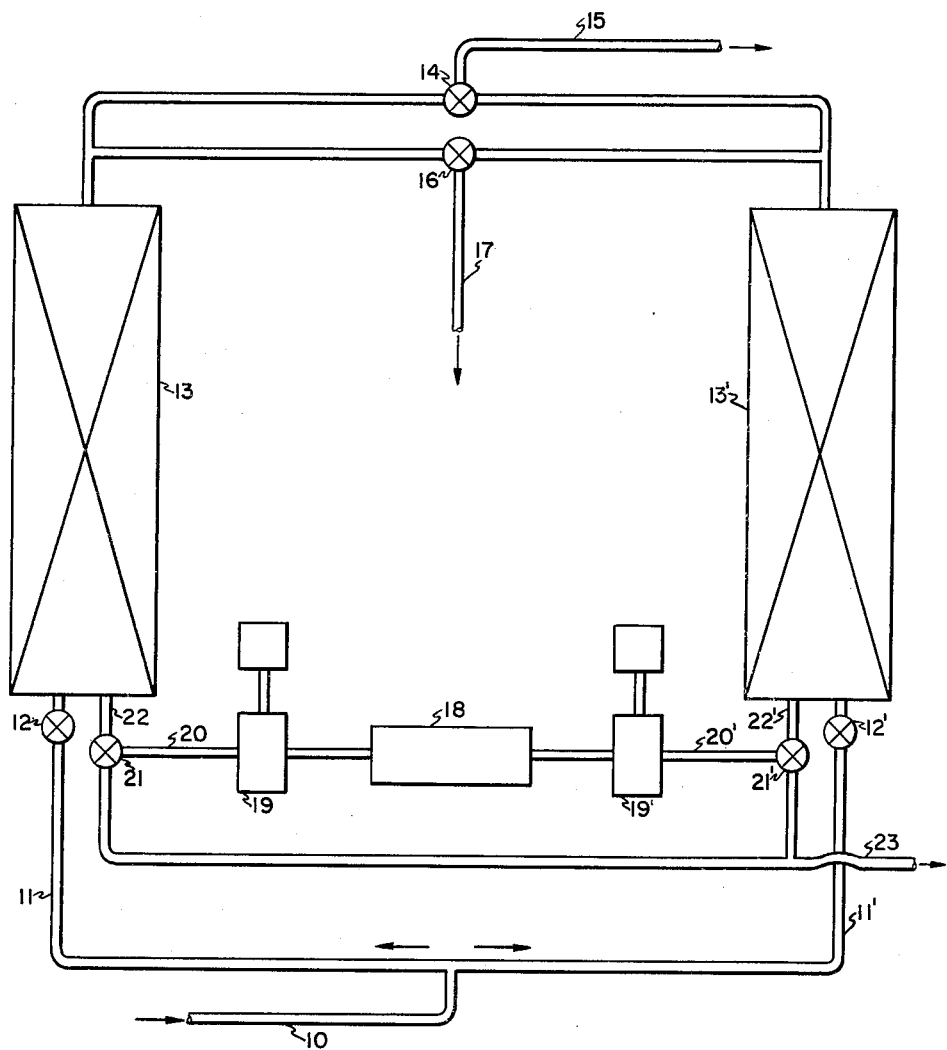

Sept. 14, 1965 F. H. PULS ETAL 3,206,500
SEPARATION OF ACRYLONITRILE
Filed Nov. 30, 1962 2 Sheets-Sheet 1

Friedrich H. Puls
Vincent L. Hughes    Inventors
Robert B. Long

By H. M. Feyrer

Attorney

Sept. 14, 1965         F. H. PULS ETAL         3,206,500
SEPARATION OF ACRYLONITRILE
Filed Nov. 30, 1962                    2 Sheets-Sheet 2

DISSOCIATION PRESSURE CURVES OF VARIOUS COMPLEXES BETWEEN ACRYLONITRILE AND SOLID CUPROUS CHLORIDE.

DISSOCIATION PRESSURE CURVE FOR THE COMPLEX BETWEEN ACRYLONITRILE AND SOLID CUPROUS CYANIDE

Friedrich H. Puls
Vincent L. Hughes    Inventors
Robert B. Long

By H. M. Freyer

Attorney

United States Patent Office 3,206,500
Patented Sept. 14, 1965

3,206,500
SEPARATION OF ACRYLONITRILE
Friedrich H. Puls, North Plainfield, Vincent L. Hughes, Scotch Plains, and Robert B. Long, Wanamassa, N.J., assignors to Esso Research and Engineering Company, a corporation of Delaware
Filed Nov. 30, 1962, Ser. No. 241,200
11 Claims. (Cl. 260—465.9)

The present invention relates to the separation of chemicals and, in partciular, to the separation and purification of acrylonitrile from mixtures containing acetonitrile.

Unsaturated aliphatic nitriles, especially acrylonitrile, are useful monomers for the production of synthetic polymers. Various methods for the synthesis of acrylonitrile have been proposed such as by the reaction of acetylene with hydrogen cyanide in the presence of a cuprous chloride catalyst, by the reaction of propylene and ammonia in the presence of catalysts including copper oxide and by the reaction of propylene with oxygen and ammonia in the presence of copper phosphate catalysts, preferably cupric pyrophosphate.

These processes yield reactor effluents of relatively low acrylonitrile content. Economical recovery of acrylonitrile from the dilute reactor effluent is of critical importance to the over-all economics of these processes. In view of the relatively low price at which acrylonitrile is currently sold, recovery of the acrylonitrile from these dilute reactor effluents by conventional methods such as absorption in water, extractive and azeotropic distillation is not efficient enough to make these processes economically attractive or competitive on a commercial scale.

It is an object of this invention to provide a novel, practical and economic process for the separation of acrylonitrile from reaction mixtures containing a relatively low concentration thereof.

It is also an object of this invention to provide an economic process for the recovery of acrylonitrile of high degree of purity from reaction mixtures containing low concentrations of acrylonitrile in admixture with acetonitrile.

It is a further object of this invention to provide an economic process for the recovery of acrylonitrile of high degree of purity from reaction mixtures containing a low concentration of acrylonitrile by the use of a rapid cycling system to be described in detail hereinafter.

These and other objects will appear from the detailed specification and claims which follow.

It has now been found that it is possible to separate acrylonitrile from reaction mixtures containing a relatively low concentration thereof and especially mixtures thereof with acetonitrile by passing said mixtures through a bed of solid agent capable of preferentially forming a complex with acrylonitrile. Subsequent to the formation of the complex, the pressure is reduced below the dissociation pressure or the temperature is increased above the dissociation temperature for the acrylonitrile complex whereby the complex dissociates and purified acrylonitrile is recovered.

It has been known in the art that certain solid salts such as cuprous chloride and, in general, salts of Groups I-B and periods 5 and 6, metals of Group VIII—B (Hubbard Rev. Ed., 1956) are capable of forming complexes with certain hydrocarbons, especially those having some degree of unsaturation. Accordingly, the prior art has suggested the use of such solid complexing agents in processes for the separation of hydrocarbons according to the degree of unsaturation of the compounds involved. For example, it has been suggested that olefins may be separated from diolefins by contact with solid cuprous chloride with subsequent decomposition of the diolefin cuprous chloride complex to recover the diolefin. These prior art processes involving the use of solid complexing agents have several drawbacks. The primary difficulty encountered relates to the fact the formation of the complex itself is a highly exothermic reaction and, under ordinary conditions, a gaseous feed passing over the solid complexing agent would soon rise in temperature above the point at which the complex could form under the particular pressures employed. While it is, of course, possible in a vapor phase system to mechanically refrigerate the bed, this is quite impractical since the heat of reaction occurs at the surface of the particles where the complex is being formed and in a fixed bed system, the internally located particles do not have sufficient proximity to the coolant to permit an adequate control of the temperature conditions throughout the bed. For these reasons the prior art has mostly concerned itself with separations of this type using liquid systems where temperature control is less of a problem. For the above and other reasons, processes using solid complexing agents to separate hydrocarbons have not met with commercial acceptance.

The process in accordance with the present invention will, in a preferred embodiment, entail the use of pressure equipment which, in a simplified form will comprise a vessel containing a bed of the solid complexing agent with means for feeding gas into the vessel and through the bed, means for removing unabsorbed gases from the feed stream from the vessel, means for purging unabsorbed gases from the vessel preparatory to decomposing the complex, means for regulating the pressure within the vessel, means for removing a stream of relatively pure product and preferably automatic means for controlling the various valves in a manner to be described.

The gaseous feed containing acrylonitrile is passed into the vessel and through the bed of solid complexing agent under pressure and temperature conditions which are suitable for the formation of a complex between acrylonitrile and the solid complexing agent and, if the feed stream contains any other components which are capable of forming a complex with said solid complexing agent, the conditions applied should be unsuitable for the formation of a complex between said agent and any such other component. Of course, if there are no other components in the feed stream which form complexes with the solid complexing agent, the operator of the process is permitted considerable latitude in selecting the operating conditions. The primary requirement is to maintain the partial pressure of acrylonitrile sufficiently high and the temperatures sufficiently low to permit the formation of the acrylonitrile-solid agent complex to the degree desired. On the other hand, if the feed stream contains other components capable of forming a complex with the solid agent such as acetonitrile it becomes necessary to critically adjust the temperature and pressure variables to avoid any substantial formation of a complex with said other component. When the feed stream is charged under pressure to the vessel as indicated, acrylonitrile will be chemically absorbed by the solid agent and, at the same time, some unabsorbed acrylonitrile and the other components of the feed stream are continuously removed from the vessel. This pressure or complexing cycle may last from about 30 to 600 seconds or longer and, in any event, for a time which is insufficient to permit the temperature in the bed of complexing agent to exceed the dissociation temperature of the acrylonitrile-solid agent complex. At the end of the complexing or pressure cycle the valve permitting the unabsorbed gases to escape is closed and the supply of fresh feed to the vessel is cut off. Simultaneously a valve is opened to permit the removal of a purge stream containing most of the unreacted acrylonitrile and the other components contained in the feed stream from the vessel. This purge may last for from 1 to 15 seconds or longer and will preferably, but not necessarily, be stopped before the partial pressure of acrylonitrile drops below the dissociation pressure of the acrylonitrile-solid agent complex at the temperature of the bed. When the purge cycle is completed, a product line valve is then opened depressuring the vessel to below dissociation pressures of the acrylonitrile-solid agent complex permitting the withdrawal of relatively pure acrylonitrile product. Thus, the basic process comprises three cycles or steps of relatively short duration which are (1) a complexing or high pressure cycle, (2) a purge cycle, and (3) a dissociation or low pressure cycle.

The preferred solid complexing agent used in accordance with the present invention is solid cuprous chloride. However, other solid complexing agents which have similar characteristics may be used in its place, for example, other cuprous halides such as cuprous bromide or iodide as well as other cuprous salts such as cyanide, nitrate, sulfate, phosphate and the like. Additionally, corresponding salts of other Group I-B metals such as Au (I), Ag (I) may be utilized since they are known to form complexes with various unsaturated hydrocarbons and behave similarly with acrylonitrile or acrylonitrile-containing mixtures in spite of the fact that the complexing with the latter takes place through the nitrile rather than the olefinic bond. Additionally, corresponding salts of periods 5 and 6 metals of Group VIII-B, such as Pt (II), Pd (II), If (II), Rh (I), Ru (I), Os (I), or mixtures thereof may be used. It is pointed out that the complexing agent will be utilized in a form with sufficiently high surface area so that maximum contact between gaseous acrylonitrile molecules and the metal ions of the complexing agent is achieved during the complexing cycle. The complexing agent may be maintained in either a fixed, moving, or fluidized bed. In moving or fluidized bed operations it is preferable, if possible, to have counter-current contact of the gaseous acrylonitrile feed and the complexing agent. In fluidized solids operations, counter-current contact can be readily achieved by passing the complexing agent in finely divided form downwardly through a tray type, or packed tower, supplying gaseous acrylonitrile feed to the bottom of the tower, withdrawing unabsorbed gases overhead and the acrylonitrile-solid agent complex from the bottom of the tower for discharge into a separate vessel for decomposing the complex. In view of the heat transfer problems, moving bed or fluidized solids operations are preferred when a temperature cycle, i.e., absorption cold and dissociation hot is used and fixed bed for pressure cycle operations.

To define the process in more detail, reference is made to the accompanying drawing in which FIGURE 1 is a diagrammatic illustration of a two-vessel, pressure cycling system for separating and recovering acrylonitrile from dilute mixtures thereof containing acetonitrile.

Referring to FIGURE 1, a gaseous feed containing about 7 mol percent of nitriles is supplied via inlet line 10 to line 11 and through control valve 12 into vessel 13 which is charged with a suitable solid complexing agent such as cuprous chloride. During the complexing cycle in vessel 13, a second vessel 13' will be undergoing purge and complex decomposition cycles and vice versa as will be described. In the pressuring cycle of vessel 13, valve 12 is open to permit passage of the feed gas mixture through line 11 into vessel 13 and three-way valve 14 is adjusted to permit the discharge of stripped gases from vessel 13 via line 15. Valve 14 should be of the pressure regulating type to permit an adjustment of the pressure within vessel 13. Conditions in vessel 13 are maintained at a sufficient pressure and at a temperature to permit the complexing of acrylonitrile with the solid complexing agent. It is to be understood that when speaking of pressures within vessel 13, the partial pressure of the acrylonitrile is the critical factor and, accordingly, if the feed gases contain only a minor amount of acrylonitrile, it is necessary to adjust the total pressure upwardly in order to obtain sufficient partial pressure of acrylonitrile to permit complex formation. For example, acrylonitrile can be recovered from a reactor effluent containing about 4 mol percent acrylonitrile and 0.4 mol perecnt acetonitrile with up to 90% yield by selective adsorption on cuprous chloride in a fluidized bed at about room temperature and 15 to 30 pounds total pressure.

After a predetermined period based on time, temperature and/or pressure, valves 12 and 14 are automatically closed and three-way valve 16 is opened to permit a purge from vessel 13 via line 17 thereby reducing the pressure in vessel 13 for the purge and/or dissociation cycle. The purge cycle should be of short duration if it is to vent vessel 13 to pressures below the dissociation pressure of the acrylonitrile complex. If, on the other hand, the purge is regulated to reduce the pressure to a point above the dissociation pressure of the acrylonitrile complex, a longer purge time may be utilized. Variations of the purge cycle are, therefore, within the discretion of the operator. The purge stream may be recovered via line 17 and will contain higher concentrations of acetonitrile than the feed mixture supplied through inlet line 10.

At the completion of the purge cycle or, alternatively, during the purge cycle, relatively pure acrylonitrile from tank 18 may be passed as sweep gas through the bed of solid complexing agent via pump 19, line 20, valve 21 and line 22. Preferably, the pressure in tank 18 of pure acrylonitrile is maintained at the same or at a higher level than the highest pressure in vessel 13. This may be accomplished by compressor means 19 and 19'. After the purge and sweep cycles, all valves leading to and from vessel 13 except valve 21 will be closed. Opening of valve 21 will then permit the gaseous acrylonitrile formed by dissociation of the complex to exit via line 23 as pure product. Sufficient pure acrylonitrile will be passed via line 21 and compressor 19 into tank 18 in order to maintain pure acrylonitrile readily available and under sufficient pressure to serve as sweep gas.

It is now apparent that during the pressuring cycle of vessel 13, the companion vessel 13' which will have been pressured previously with the acrylontrile-containing feed stream and, accordingly, will contain the acrylonitrile-solid agent complex, will be undergoing purge, sweep and dissociation cycles by the appropriate positioning of valves 14, 16, 12' and 21' and compressor 19'. Vessel 13' will undergo its pressure cycle during the purge and dissociation cycles of vessel 13 and, in this way, pure acrylonitrile can be continuously withdrawn via line 23.

Figure 2:
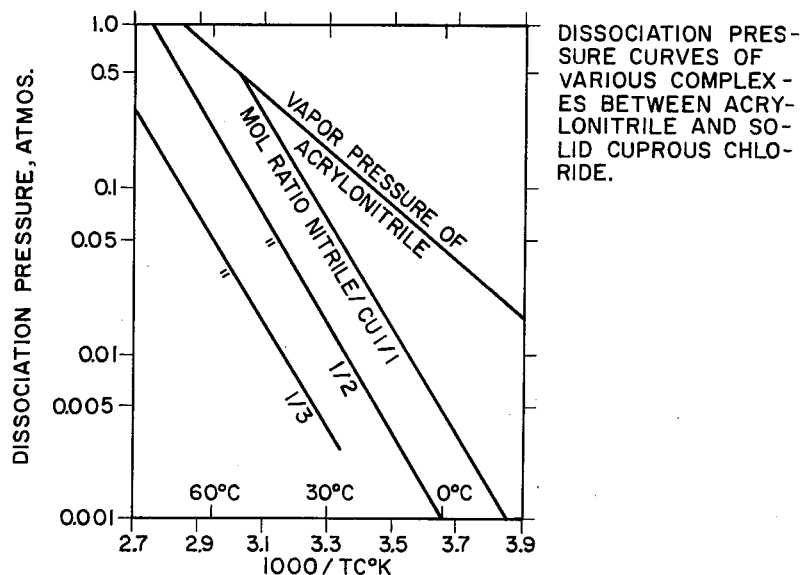
Figure 3:
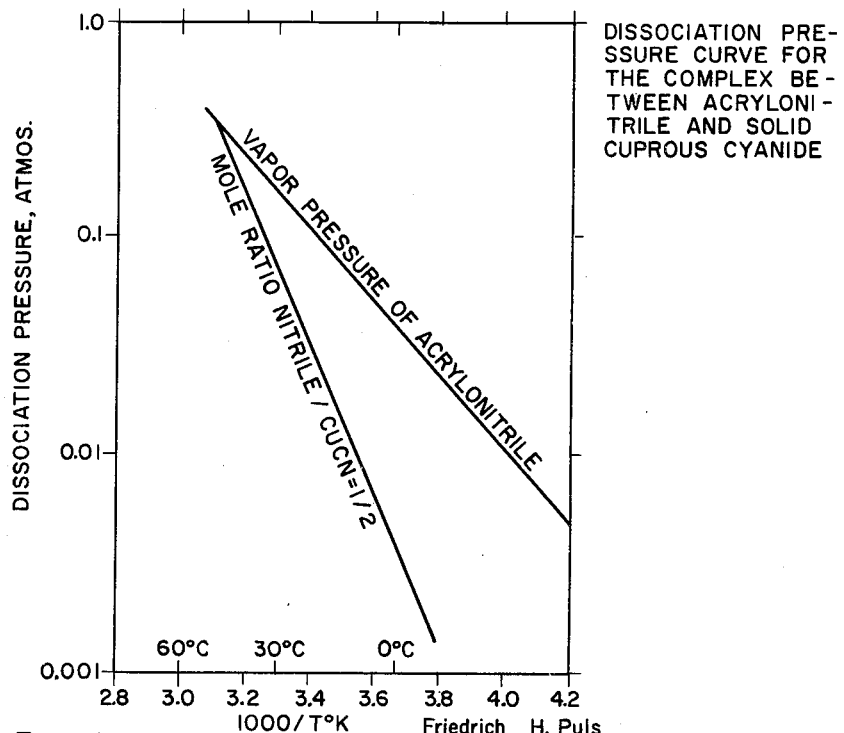

In order that those skilled in the art may be able to determine the appropriate conditions for forming and dissociating various acrylonitrile-solid agent complexes, dissociation pressure curves for the several complexes are shown in FIGURES 2 and 3. As may be seen from FIGURE 2, acrylonitrile forms three different types of complexes with cuprous chloride having nitrile/Cu mole ratios of 1/3, 1/2 and 1/1. At about room temperature and low partial pressure, the complexes with the mole ratios of 1/2 are formed. When the absorbent is saturated, additional amounts of nitrile are complexed until the mole ratio of nitrile/Cu reaches 1/1, provided that the partial pressure of the nitrile in the feed is above the dissociation pressure of the complex with the mole ratio 1/1.

The complex with the nitrile/Cu mole ratio 1/3, is not formed at room temperature since its formation probably requires a higher temperature to overcome a certain activation energy. This critical temperature is broadly about 30° higher for the 1/3 complex betwen acetonitrile and cuprous chloride than for the corresponding acrylonitrile complex. These circumstances are essential for the optimization of an acrylonitrile recovery process, since they allow recovery of acrylonitrile, with the highest possible yield as the 1/3 complex while acetonitrile does not yet react. FIGURE 3 similarly illustrates the dissociation curve for the complex between acrylonitrile and solid cuprous cyanide having a mole ratio of acrylonitrile/CuCN of 1/2.

The following table shows the broad ranges of temperatures, pressures and times which may be used for the separation of acrylonitrile from mixtures thereof with acetronitrile.

This indicates that the selective chemisorption of acrylonitrile from an acrylonitrile/acetonitrile feed mixture diluted in nitrogen was occurring almost according to theory when absorbing on activated $Cu_2Cl_2$ at 26° C. It is presupposed that at 26° C. acrylonitrile and cuprous chloride reacted in the mole ratio 1/2, and that no absorption in the mole ratio of 1/3 had occurred.

The material balance of this run is given below:

SELECTIVE ABSORPTION OF ACRYLONITRILE

|  | Feed | | Unreacted | | Absorbed | |
| --- | --- | --- | --- | --- | --- | --- |
|  | Mole percent | Grams | Mole percent | Grams | Mole percent | Grams |
| Acrylonitrile | 91.3 | 11.35 | 66.8 | 2.09 | 99.72 | 9.26 |
| Acetonitrile | 8.7 | 0.83 | 33.2 | 0.81 | 0.28 | 0.02 |

The subsequently desorbed acrylonitrile contained 0.2 to 0.3% acetonitrile due to physical adsorption. The acetonitrile contamination was that high since only 11.6%

*Table I*

|  | CuCl | | CuCN | |
| --- | --- | --- | --- | --- |
|  | Broad | Preferred | Broad | Preferred |
| Complexing: | | | | |
| Temperature,°C | −40–110 | 0–60 | −40–85 | −30–20 |
| Acrylonitrile pressure, atmos | 0.01–2 | 0.01–0.6 | 0.001–0.3 | 0.01–0.1 |
| Total pressure, atmos | 0.1–40 | 1–10 | 0.1–10 | 0.2–1 |
| Time, sec | 30–600 | 60–300 | 30–600 | 60–300 |
| Purge: | | | | |
| Temperature,°C | Same as Complexing Temperature | | | |
| Acrylonitrile pressure, atmos | 0–1 | 0.01–0.1 | 0–0.1 | 0.005–0.05 |
| Total pressure, atmos | 0.001–1 | 0.01–0.1 | 0.001–0.1 | 0.005–0.05 |
| Time, sec | 5–300 | 10–60 | 5–300 | 10–60 |
| Dissociation: | | | | |
| Temperature,°C | 0–150 | 20–100 | −20–100 | 0–70 |
| Acrylonitrile pressure, atmos | 0.001–4 | 0.006–1 | 0.0001–1 | 0.004–0.5 |
| Total press., atmos | 0.001–4 | 0.006–1 | 0.0001–1 | 0.004–0.5 |
| Time, sec | 30–1200 | 60–600 | 30–1200 | 60–600 |

The following examples are illustrative of the present invention.

EXAMPLE 1

A reactor was charged with 300 grams of cuprous chloride that had previously been activated (as by forming a complex with ethylene by contact with an ethylene-ethane mixture at about 0° C. and 500 p.s.i.g. for about 30 seconds, purging at about 10° C. and 37 p.s.i.g. for about 10 seconds and dissociating the ethylene-cuprous chloride complex at about 0° C. and 0 p.s.i.g. for about 40 seconds and repeating this procedure several times). The nitriles were introduced into the agitated bed of cuprous chloride particles by a nitrogen sweep of about 250 cc./min. The feed traps, in which the nitrogen was saturated with nitriles at about 11° C., contained a liquid mixture of 90 mole percent acrylonitrile and 10 mole percent acetonitrile. Thus, the partial pressures of acrylonitrile and acetonitrile in the feed gas stream to the reactor were 0.063 and 0.006 atm. respectively.

Assuming that no acetonitrile would be absorbed, and that the partial pressure of acrylonitrile in the reactor effluent would be 0.012 atm. (=dissociation pressure of complex with acrylonitrile/Cu mole ratio 1/2 at 26° C.), acetonitrile should theoretically be concentrated in the unreacted and condensed nitriles mixture to 27.9 weight percent (33.3 mole percent). This corresponds to a theoretical acrylonitrile recovery of 81%.

In this run, the residual nitriles were condensed in a dry ice trap at −70° C. and as analyzed by gas chromatography, they contained 27.8 weight percent acetonitrile. of the theoretical capacity of the 300 g. $Cu_2Cl_2$ were utilized. When the amount of physically adsorbed acetonitrile is recalculated for the entire $Cu_2Cl_2$ capacity for acrylonitrile, the acetonitrile concentration in the total desorbed product would be about 310 p.p.m. This is within the current specification for commercial acrylonitrile which limits the acetonitrile concentration to a maximum of 400 p.p.m. Furthermore, it was demonstrated that the adsorbed acetonitrile could be purged and removed completely with the first few percent of desorbed acrylonitrile.

EXAMPLE 2

The reactor was charged with 213 g. of commercial cuprous chloride (94% purity). The reactor temperature was controlled at 26.5° C. The acrylonitrile feed concentration was 11.7 mole percent and the acetonitrile concentration was 0.2 mole percent. The nitrogen rate was varied between 25 and 260 cc./min. In addition, a recycle stream between reactor effluent and reactor inlet was installed with a rate of 1500 to 2000 cc./min. As expected, the recovery of acrylonitrile was less than with the activated cuprous chloride. However, the recovery obtained in this run with unactivated $Cu_2Cl_2$ is still considerable and varied between 26 and 79% of theory. Since the activity of $Cu_2Cl_2$ increases with the first absorption cycles, the recovery which can be expected with commercial $Cu_2Cl_2$ increases considerably during the process.

The results of this absorption test with unactivated $Cu_2Cl_2$ are summarized in the following table.

Table II
SELECTIVE ABSORPTION AND DESORPTION OF ACRYLONITRILE

| Nitrogen sweep, cc./min. | Nitriles feed,[1] g. | Unreacted nitriles, g. | Absorbed (desorbed), g. | Recovery of acrylonitrile, percent [2] |
|---|---|---|---|---|
| Absorption: | | | | |
| 50 | 8.6 | 2.6 | 6.0 | 70.9 |
| 100 | 10.2 | 4.7 | 5.5 | 54.9 |
| 56 | 4.3 | 1.8 | 2.5 | 59.1 |
| 60 | 2.5 | 1.0 | 1.5 | 61.0 |
| 141 | 9.0 | 5.2 | 3.8 | 43.0 |
| 66 | 2.9 | 1.27 | 1.63 | 57.1 |
| 35 | 0.85 | 0.27 | 0.58 | 69.4 |
| 26 | 2.34 | 0.67 | 1.67 | 72.6 |
| 155 | 14.6 | 9.0 | 5.6 | 38.9 |
| 24 | 1.27 | 0.35 | 0.92 | 73.6 |
| 214 | 7.6 | 5.1 | 2.5 | 33.4 |
| 25 | 1.5 | 0.43 | 1.07 | 72.6 |
| 260 | 7.5 | 5.7 | 1.8 | 24.0 |
| | | | [3] 35.07 | |

| Desorption | Acetonitrile [4] | |
|---|---|---|
| | Wt. percent | Grams |
| 1st fraction (0.5) | 0.73 | 0.0037 |
| 2nd fraction (0.5) | 0.31 | 0.0016 |
| 3rd fraction (1.1) | 0.29 | 0.0032 |
| 4th fraction (2.2) | 0.15 | 0.0033 |
| 5th fraction (2.9) | 0.03 | 0.0009 |
| 6th fraction (3.9) | 0.00 | |
| 7th fraction (7.4) | 0.00 | |
| (18.50) | | [5] 0.0127 |

Residual absorbed acrylonitrile: 16.57.
[1] Acetonitrile concentration in the feed=1.58 wt. percent.
[2] Theoretical recovery at conditions of experiment=90.0 percent.
[3] 65.5% of theoretical capacity as complex "1/2".
[4] Analyzed by gas chromatography, 5-meter column, 20 wt. percent Carbowax-20,000, at 100° C. minimum detectable=0.005 to 0.01 percent acetonitrile.
[5] Calculated on 35 g. absorbed acrylonitrile=363 p.p.m., calculated on theoretical capacity=238 p.p.m.

The foregoing description contains a limited number of embodiments of the present invention. It will be understood that these embodiments are illustrative only and that numerous variations are possible without departing from the scope of this invention as defined in the following claims.

What is claimed is:

1. A process for the separation of acrylonitrile from gaseous mixtures thereof with acetonitrile which comprises passing said mixture through a bed of solid metal salt selected from the group consisting of cuprous chloride and cuprous cyanide, maintaining said mixture in contact with said bed of solid metal salt at temperatures of −40 to 110° C. and pressures such that the partial pressure of acrylonitrile is above the dissociation pressure of an acrylonitrile complex with said solid metal salt for a time sufficient to form an acrylonitrile-solid metal salt complex, discontinuing the supply of said mixture to said acrylonitrile-solid metal salt complex, purging uncomplexed gaseous components from said bed, and thereupon dissociating said complex by holding it under temperature and pressures such that the partial pressure of acrylonitrile is less than the dissociation pressure of the acrylonitrile-solid metal salt complex for a time sufficient to dissociate said complex and recovering acrylonitrile in a purer state than it existed in the gaseous feed mixture.

2. The process as defined in claim 1 in which the metal salt is cuprous chloride.

3. The process as defined in claim 1 in which the metal salt is cuprous cyanide.

4. The process of claim 1 in which the bed of solid metal salt is a dense fluidized bed fluidized by the gaseous mixture passed upward through the bed.

5. A process for the separation of acrylonitrile from gaseous mixtures thereof with acetonitrile which comprises passing said mixture through a bed of solid metal salt selected from the group consisting of cuprous chloride and cuprous cyanide at temperatures of −40 to 110° C. and pressures such that the partial pressure of acrylonitrile is above the dissociation pressure of an acrylonitrile-solid metal salt complex for a time sufficient to form an acrylonitrile-solid metal salt complex, discontinuing the supply of said gaseous mixture to said acrylonitrile-solid metal salt complex formed, partially reducing the partial pressure of acrylonitrile on said bed and purging uncomplexed gaseous feed components from said bed, thereupon further reducing the partial pressure of acrylonitriles on said bed below the dissociation pressure of the acrylonitrile-solid metal salt complex and recovering acrylonitrile in a purer state than it existed in the gaseous feed mixture.

6. A process for the separation of acrylonitrile from gaseous mixtures thereof with acetonitrile which comprises passing said mixture through a bed of soild metal salt selected from the group consisting of cuprous chloride and cuprous cyanide at temperatures of −40 to 110° C. at total pressures of 0.1 to 40 atmospheres (gauge) such that the partial pressure of acrylonitrile is above the dissociation pressure of an acrylonitrile complex with said solid metal salt and for periods of from 30 to 600 seconds to form said complex, partially reducing the pressure on said bed and purging uncomplexed gaseous feed components from said bed, thereupon further reducing the pressure on said bed to about 0.001 to 4 atmospheres at temperatures of from 0 to 150° C. such that the partial pressure of acrylonitrile is less than the dissociation pressure of the acrylonitrile-solid metal salt complex to decompose the acrylonitrile-solid metal salt complex and recovering acrylonitrile in a purer state than it existed in the gaseous feed mixture.

7. The process as defined in claim 6 in which the metal salt is cuprous chloride.

8. The process as defined in claim 6 in which the metal salt is cuprous cyanide.

9. A process for the separation of acrylonitrile from gaseous mixtures thereof with acetonitrile which comprises passing said mixture through a bed of solid metal salt selected from the group consisting of cuprous chloride and cuprous cyanide at temperatures of −40 to 110° C. and pressures such that the partial pressure of acrylonitrile is above the dissociation pressure of an acrylonitrile complex with said solid metal salt for a time sufficient to form said complex, discontinuing the supply of said gaseous mixture to said bed, purging uncomplexed gaseous feed components from the bed, thereupon dissociating said complex by raising its temperature, such that the partial pressure of acrylonitrile is less than the dissociation pressure of the acrylonitrile-solid metal salt complex, recovering acrylonitrile in a purer state than it existed in the gaseous feed mixture, cooling the bed and resuming the supply of gaseous feed mixture thereto.

10. The process as defined in claim 9 in which the metal salt is cuprous chloride.

11. The process as defined in claim 9 in which the metal salt is cuprous cyanide.

References Cited by the Examiner
UNITED STATES PATENTS

| | | | |
|---|---|---|---|
| 2,738,030 | 3/56 | Keller et al. | 260—465.9 XR |
| 3,007,853 | 11/61 | Patron et al. | 260—465.9 XR |

CHARLES B. PARKER, *Primary Examiner.*